United States Patent [19]

Karato

[11] 3,715,466

[45] Feb. 6, 1973

[54] COLOR TELEVISION CAMERA EQUIPMENT

[75] Inventor: Yoshitero Karato, Tokyo, Japan

[73] Assignee: Shiba Electric Co., Ltd., Chiyoda-ku, Tokyo, Japan

[22] Filed: Dec. 2, 1970

[21] Appl. No.: 94,324

[30] Foreign Application Priority Data

Dec. 3, 1969 Japan ....................................44/96480

[52] U.S. Cl. ..............................178/5.4 ST, 178/5.4 F

[51] Int. Cl. ..............................................H04n 9/06

[58] Field of Search ........................178/5.4 ST, 5.4 F

[56] References Cited

UNITED STATES PATENTS 3,566,018 2/1971 Macovskl..........................178/5.4 ST 3,300,580 1/1967 Takagi et al. ....................178/5.4 ST

*Primary Examiner*—Richard Murray

*Attorney*—Chittick, Pfund, Birch, Samuels & Gauthier

[57] ABSTRACT

A striped color filter assembly is used which consists of at least two striped color filter elements capable of preventing the transmission of at least one color by one filter element and another color by another filter element in light from a subject to be televised. The strips of one of the color filter elements are positioned out of phase relative to those of the other color filter substantially by one-fourth pitch. The striped color filter assembly is located between a subject and a photoelectric effect plate of an image tube. The harmonic component of one color signal component is used as the fundamental frequency of the carrier. A plurality of color signals may be obtained from the single image pick up tube.

10 Claims, 17 Drawing Figures

*INVENTOR.*
YOSHITERU KARATO
BY Chittick, Pfund, Birch, Samuels & Gauthier
ATTORNEYS INVENTOR.
YOSHITERU KARATO
BY Chittick, Pfund, Birch, Samuels & Gauthier
ATTORNEYS

*INVENTOR.*
YOSHITERU KARATO
BY Chittick, Pfund,
Birch, Samuels & Gauthier
ATTORNEYS INVENTOR
YOSHITERU KARATO
BY Chittick, Pfund, Birch, Samuels & Gauthier
ATTORNEYS

INVENTOR.
YOSHITERU KARATO

BY Chittick, Pfund, Birch, Samuels & Gauthier
ATTORNEYS

COLOR TELEVISION CAMERA EQUIPMENT

BACKGROUND OF THE INVENTION

The present invention relates to generally a color television camera equipment and more specifically a color television camera equipment capable of deriving a plurality of color signals from a single image pickup tube.

In general the conventional color television camera separates into three primary color component parts the optical image picked up by the camera by special color filters so that the three primary color images may be directed to three separate image pick up tubes for deriving the color signals. Therefore the conventional color television camera equipment is large in size and has complex circuitry.

SUMMARY OF THE INVENTION

The primary object of the present invention is therefore to provide an improved color television camera equipment.

Another object of the present invention is to provide an improved color television camera equipment capable of deriving a plurality of color signals from a single image pick up tube.

Another object of the present invention is to provide an improved color television camera equipment capable of separating the color signal output of the image pick up tube.

Another object of the present invention is to provide an improved color television camera equipment capable of separating from the color signal output of the image pick up tube the carrier required for separating said color signal output in a simple manner.

In brief, a color television camera equipment in accord with the present invention comprises an image pick up tube and a striped color filter assembly interposed between the image pick up tube and a subject to be televised; the striped color filter assembly consisting of at least two striped color filters disposed out of phase relative to each other by one-fourth pitch and each capable of preventing the transmission of at least one color one color by one filter element and another color by another filter element, whereby a plurality of color signal components may be separately derived from the single image pick up tube so as to be separated.

Figure 1:
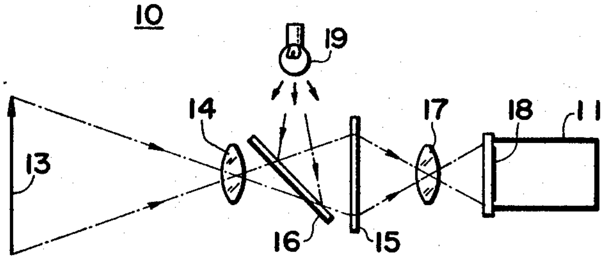
FIG. 1 is a schematic view illustrating the fundamental construction of a color television camera equipment in accordance with the present invention.
Figure 3A:
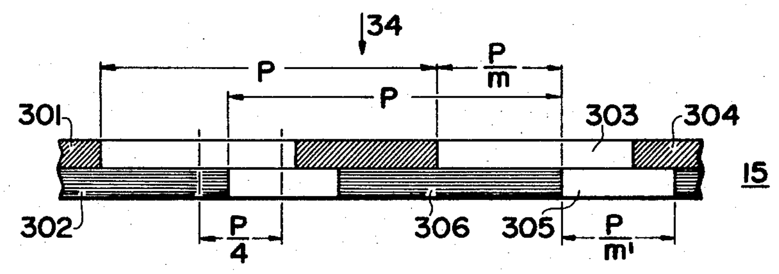
Figure 4:
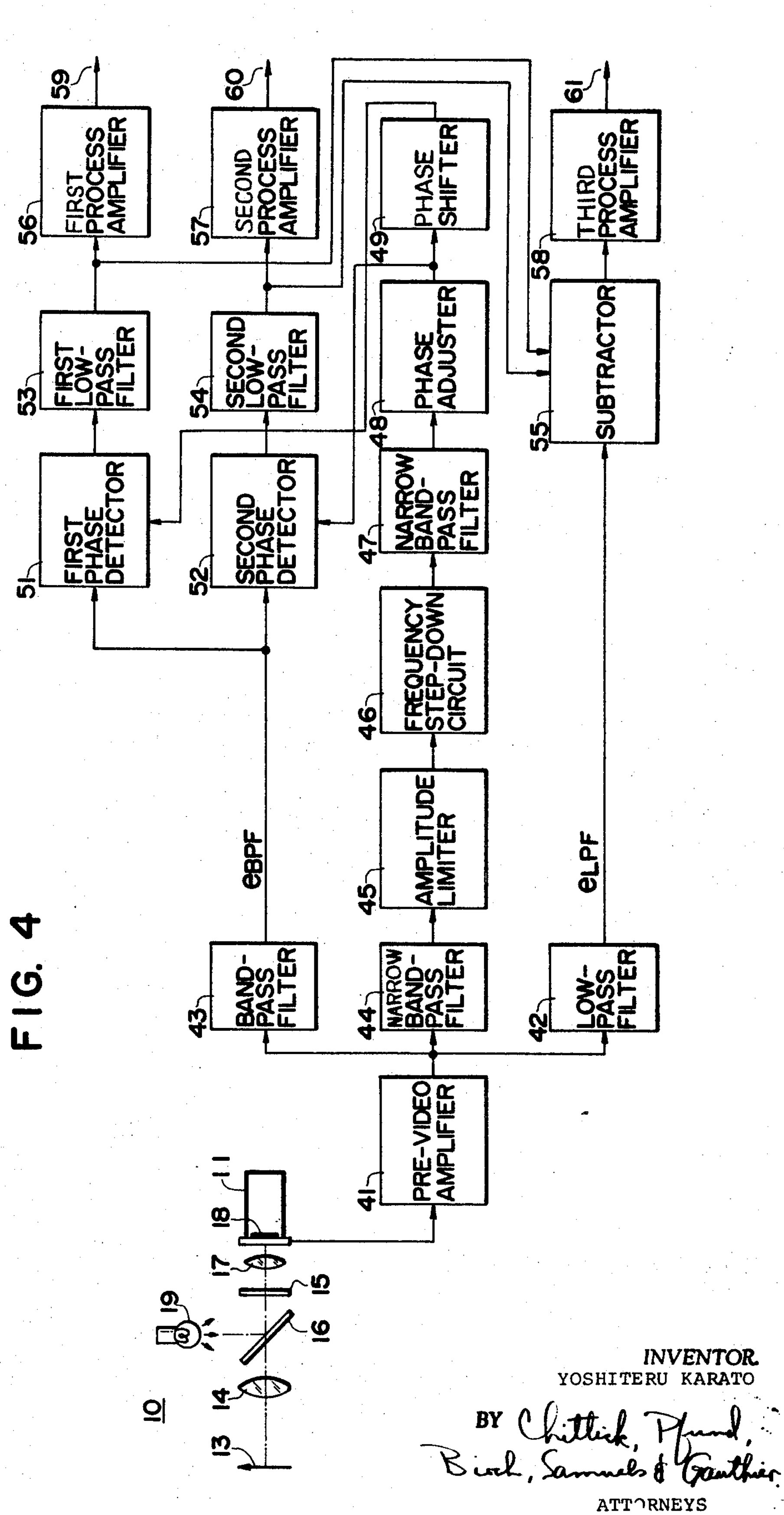
Figure 5:
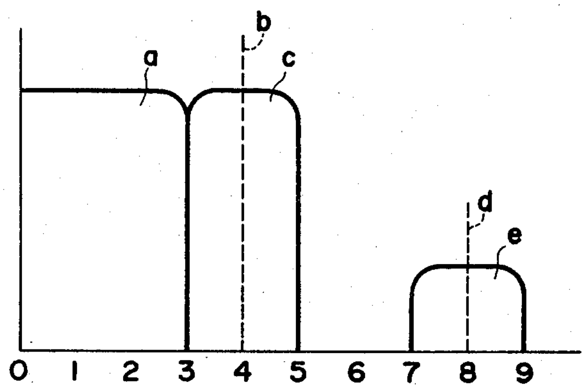
Figures 6A, 6B, 6C:
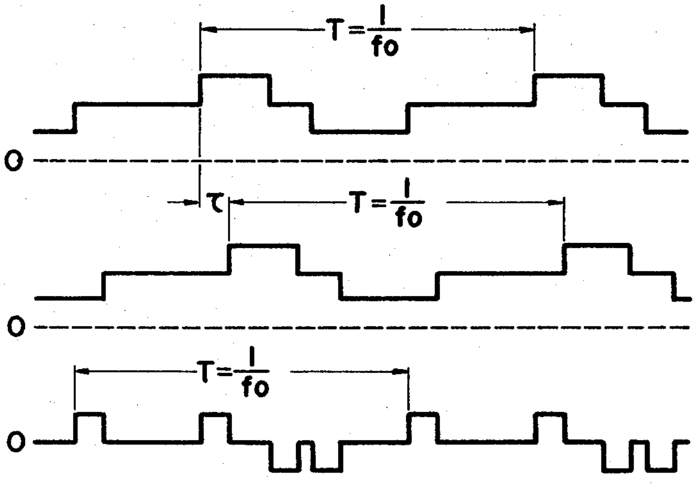
Figure 7:
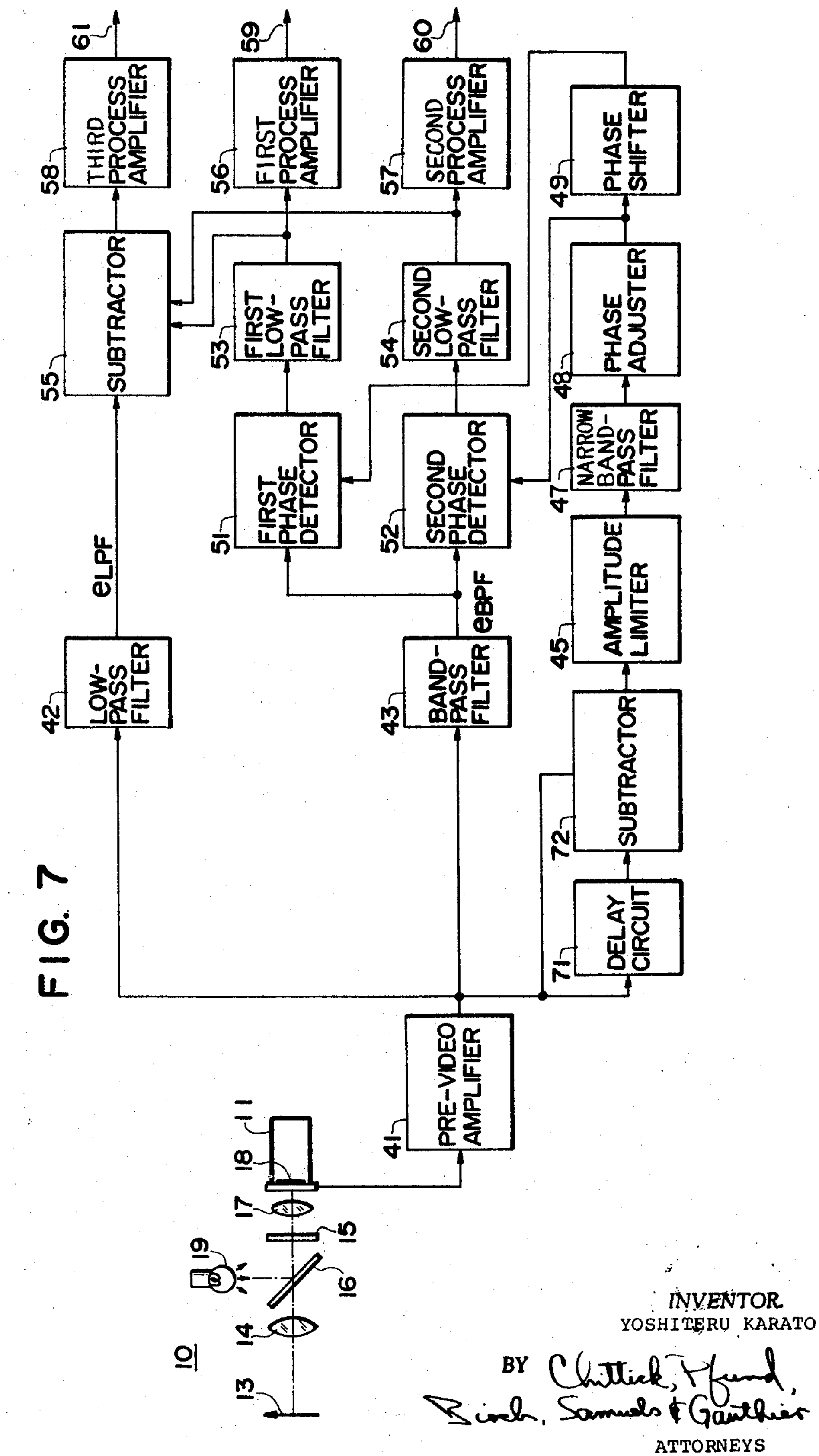
Figures 8A, 8B:
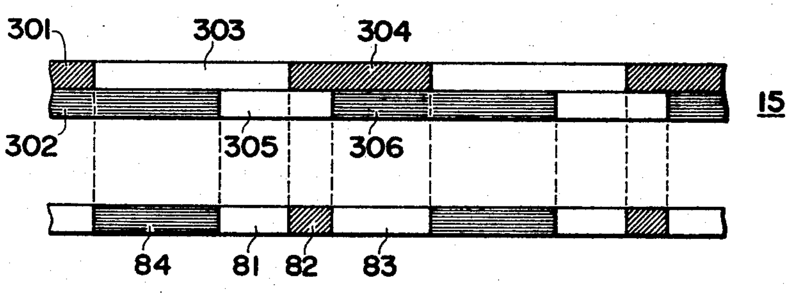
Figure 9:
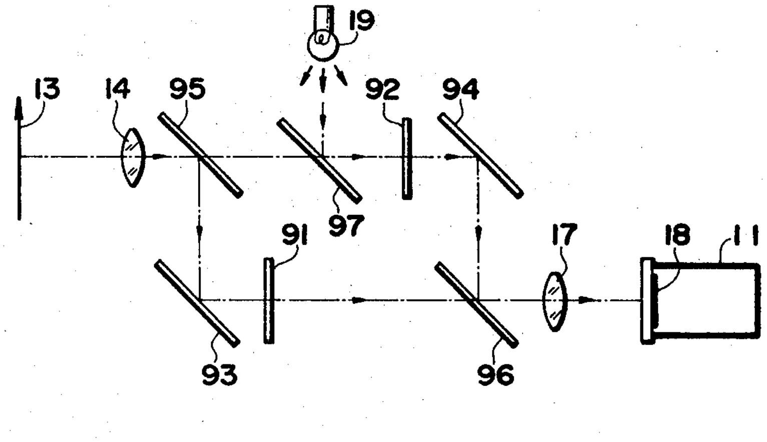
Figure 10:
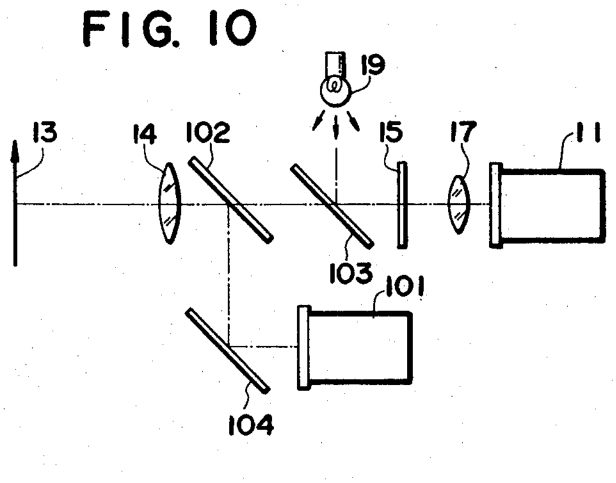

FIG, 2 is a perspective view of a striped color filter element used in the present invention;

FIG, 3A is a fragmentary top view of a striped color filter assembly used in the color television equipment shown in FIG. 1;

FIG. 3B, 3C, 3D and 3E illustrate the waveforms of the color components obtained when white light is incident upon the striped color filter shown in FIG. 3A and the synthesized waveform of the color components;

FIG. 4 is a block diagram of the optical or image section of the color television camera equipment shown in FIG. 1 and its associated circuitry;

FIG. 5 illustrates the frequency versus output response characteristic curve of the color television camera equipment in accordance with the present invention;

FIGS. 6A, 6B and 6C are diagrams of distribution of color components for explanation of another method of separating the carrier frequency from the out-put signal of the image pick up tube;

FIG. 7 is a block diagram of a color television camera equipment in accordance with the present invention based upon the method indicated in FIGS. 6A–6C;

FIGS. 8A and 8B are for explanation of a variation of the striped color filter assembly used in the present invention; the color filter elements similar to those shown in FIG. 3A being illustrated to more clearly indicate the variation shown in FIG. 8B; and FIGS. 9 and 10 are schematic diagrams of other embodiments of the color television camera equipment in accordance with the present invention.

DESCRIPTION OF THE PREFERRED EMBODIMENTS

FIG. 1 illustrates diagrammatically the fundamental arrangement of a color television equipment of the present invention. The optical section generally designated by 10 comprises an image pick up tube 11, a camera lens 14, a striped color filter assembly 15 to be described in detail hereinafter, a half-mirror 16, a relay lens 17 and a bias light source 19 which is adapted to generate the carrier even when no light is reflected from a subject 13. The image of the subject 13 is formed upon the photoconductive plate 18 of the image pick up tube 11.

Figure 2:
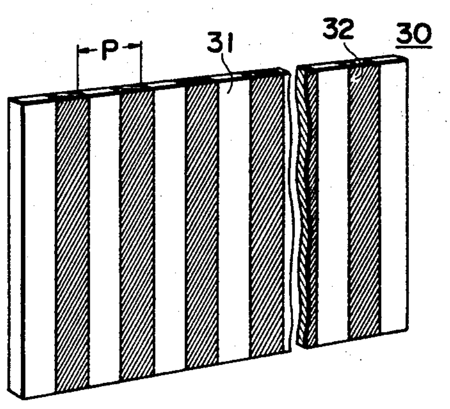

FIG. 2 illustrates one example of a striped color filter element 30 of the striped color filter assembly 15 shown in FIG. 1. The color filter element 30 consists of two types of color filter strips 31 and 32 alternately arrayed on the same plane. The color filter strips 31 and 32 have different spectral absorption. For example, the strips 31 may transmit all of incident light from the subject 13 while the strips 32 may transmit all incident light except that of a predetermined wavelength range. The pitch which is defined as the sum of the widths of two adjacent strips 31 and 32 in this specification will be determined based upon the principle to be described hereinafter.

FIG. 3A schematically illustrates the striped color filter assembly 15 shown in FIG. 1 consisting of two striped color filter elements 30 shown in FIG. 2. The two color filter elements 301 and 302 have the same pitch and are overlaid upon the other in such a manner that the their strips extend in the same direction and the color filter elements 301 and 302 are out of phase by a one-fourth pitch.

When white light 34 is incident upon the color filter assembly 15, the colored light transmitted therethrough are illustrated in FIGS. 3B–3E. In the present embodiment, it is assumed that the first color filter element strip 303 may transmit all of incident light while the second strip 304 may transmit all of incident light except red color. The first strip 305 of the second color filter element 302 may transmit substantially all of incident light while the second strip 306 may transmit all of incident light except blue light.

Figure 3B:
Figure 3C:

FIG. 3B shows the red light component of the light incident upon the faceplate 18 of the image tube 11; FIG. 3C, the blue light component; and FIG. 3D, the green light component. As seen from FIGS. 3B and 3C, the red and blue light components are sampled with a sampling frequency corresponding to the pitch P of the first and second color filter elements 301 and 302, and are out of phase relative to each other by one-fourth pitch. Alternatively they may be out of phase by three-fourth pitch.

FIG. 4 is a block diagram of a color television camera equipment in accordance with the present invention including the fundamental assembly consisting of the optical section and image pick up tube shown in FIG. 1 and the associated circuitry. Reference numeral 41 designates a pre-video-amplifier for amplifying the output of the image pick up tube 11 to a predetermined level; 42, a low-pass filter for deriving the DC video signal component from the output of the pre-video-amplifier 41;43,a band pass filter for deriving the modulated signal component from the output of the pre-video-amplifier 41;and 44,a narrow-band-pass filter for deriving the carrier frequency from the output of the pre-video-amplifier 41. Reference numeral 45 designates an amplitude limiter for sufficiently limiting the amplitude to remove the amplitude modulated component; 46, a frequency step-down circuit for stepping down the frequency of the output from the amplitude limiter 45;47,a narrow-band pass filter for removing the undesired components except the carrier from the output of the frequency-step-down circuit 46;48,a phase adjuster for adjusting the phase of the carrier of a frequency fo derived from the filter 47 to the phase required for phase-detecting the frequency modulated signal; 49, a phase shifter for shifting by 90° the output of the phase adjuster 48 because the carriers of the red and blue color signal components are out of phase by 90°;51,a first phase detector for demodulating the red color signal from the outputs from the band-pass filter 43 and the phase shifter 49;52,a second phase detector for demodulating the blue color signal from the outputs from the band-pass filter 43 and the phase adjuster 48;53 and 54 a first and second low-pass filters for removing the harmonics and the carriers from the demodulated signals from the first and second phase detectors 51 and 52 so as to derive only the required signal components;55,a subtraction circuit or subtractor for removing the red and blue color signal components from the output of the low-pass filter 42 by receiving the outputs of the first and second low pass filters 53 and 54 thereby deriving only the green color signal component; and 56, 57 and 58, a first, second and third process amplifiers for receiving the outputs from the first low-pass filter 53, the second low-pass filter 54 and the subtractor 55 respectively. These process amplifiers 56, 57 and 58 have the functions of establishing the black level with respect to the green, red and blue signal components, inserting the blanking or flyback line eliminating signal, effecting the gamma correction and so on and the outputs from these process amplifiers are applied to the associated external circuitry.

Figure 3D:
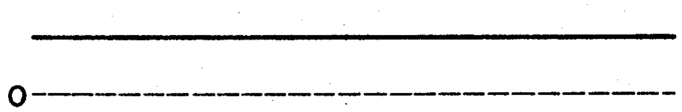
Figure 3E:
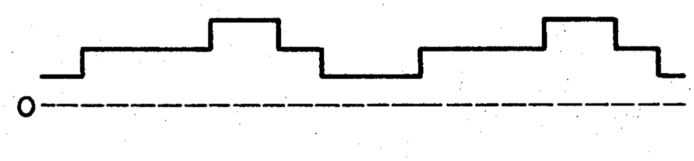

The subject 13 is focused upon the color filter assembly 15 by the camera lens 14, separated into color signals and then focused again upon the photoconductive faceplate 18 of the image pick up tube 11 by the relay lens 17. Light from the bias light source 19 is focused upon the photoconductive faceplate 18 of the image pick up tube 11 through the half-mirror 16, the striped color filter assembly 15 and the relay lens 17. The optical image upon the faceplate 18 of the image pick up tube may be converted into the electrical signals by scanning the electron beam at a right angle relative to the longitudinal direction of each of the strips of the color filter assembly 15 and the electrical signals may be derived from the electrodes of the image tube 11. The distribution of the output of the image pick up tube 11 is illustrated in FIG. 3E in which the voltage is plotted against the Y-axis while the time against the X-axis. The output signal is the summation of the red, blue and green color signals.

The output of the image pick up tube 11 are fed into the low-pass filter 42, the band-pass filter 43 and the narrow-band-pass filter 44 after it is amplified to a predetermined level by the pre-video-amplifier 41.

The required carrier which is the harmonic is derived from the output of the pre-video-amplifier 41 in the narrow-band-pass filter 44. The output of the filter 44 is amplitude-limited by the amplitude limiter 45 and stepped down to the frequency *fo* of the carrier by the frequency step-down circuit 46 and fed to the phase adjuster 48 via narrow band pass filter 47 so as to be adjusted to the phase required for the phase detection. The output of the phase adjuster is then fed into the first and second phase detectors 51 and 52. In this case, the signal fed into the first phase detector 51 is shifted by 90° by the phase shifter 49.

The modulated signal is derived also from the output of the pre-video-amplifier 41 by the band-pass filter 43 and demodulated by the first and second phase detectors 51 and 52. In this case, the outputs from the phase shifter 49 and the phase adjuster 48 are used. The red color signal component is derived from the first phase detector 51 while the blue color signal component from the second phase detector 52. These color signals are fed into the first and second low-pass filters 53 and 54 respectively where the harmonic and the carriers which are noise are removed and the outputs of the filters 53 and 54 are fed on the lines 59 and 60 through the first and second process amplifiers 56 and 57.

The DC video signal is derived from the output of the previdеo-amplifier 41 by the low-pass filter 42 and is fed into the subtractor 55 to which are fed also the outputs from the first and second low-pass filters 53 and 54. Therefore the subtractor 55 derives the green color signal from the dc video signal which signal is then fed on the line 61 through the third process amplifier 58. These red, blue and green color signals are illustrated in FIGS. 3B, 3C and 3D respectively where the output voltage is plotted against the Y-axis while the time against the X-axis.

Next the theoretical analysis of the system of the present invention will be made. It is assumed that each of the striped color filter elements 301 and 302 consists of N sets of first and second strips. When the electron beam scanning time of the image pick up tube 11 is T microseconds while the flyback line eliminating time is t microseconds, then the red and blue color components are sampled with a repetitive frequency *fo*

$$fo = N/T - t \text{ MHz} \quad (1)$$

In Japan the standard electron beam scanning time $T$ is 63.5 microseconds while the flyback line eliminating time is about 10.8 microseconds.

The red and blue color components in the output signal from the image tube 11 may be expanded into Fourier series as follows:

$$E'_R = \frac{1}{m} + \frac{2}{\pi} \sum_{n=1}^{\infty} \frac{\sin\left(\frac{1}{m} n\pi\right)}{n} \cdot \cos(2\pi nfot) \quad (2)$$

$$E'_B = \frac{1}{m'} + \frac{2}{\pi} \sum_{n=1}^{\infty} \frac{\sin\left(\frac{1}{m'} n\pi\right)}{n} \cdot \cos\left(2\pi nfot - n\frac{\pi}{2}\right) \quad (3)$$

In Eqs. (2) and (3), the first terms represent the dc component while the second terms, the fundamental frequency $fo$ and its harmonics.

In general the light from the subject is not white, but includes various colors so that the red, blue and green color signal components of the light from the subject may be given below:

$$L_R = A_R + B_R \cos 2\pi F_R t \quad (4)$$

$$L_B = A_B + B_B \cos 2\pi F_B t \quad (5)$$

$$L_G = A_G + B_G \cos 2\pi F_G t \quad (6)$$

where $A_R$, $A_B$ and $A_G$: predetermined light quantities contained in the components;

$B_R$, $B_B$ and $B_G$: peak values of the variables in the components; and $E_R$, $E_B$ and $E_G$: the maximum frequencies in the components.

Therefore, the color signal components in the output signal from the image tube 11 may be given below:

$$E_R' = \text{Eq. (2)} \times \text{Eq. (4)}$$

$$= \frac{1}{m}(A_R + B_R \cos 2\pi F_R t) + \frac{2}{\pi}(A_R + B_R \cos 2\pi F_R t) \times \sum_{n=1}^{\infty} \frac{\sin\left(\frac{1}{m} n\pi\right)}{n} \cos(2\pi nfot) \quad (7)$$

$$E_B' = \text{Eq. (3)} \times \text{Eq. (5)}$$

$$= \frac{1}{m}(A_B + B_B \cos 2\pi F_B t) + \frac{2}{\pi}(A_B + B_B \cos 2\pi F_B t) \times \sum_{n=1}^{\infty} \frac{\sin\left(\frac{1}{m'} n\pi\right)}{n} \cos\left(2\pi nfot - n\frac{\pi}{2}\right) \quad (8)$$

$$E_G' = A_G + B_G \cos 2\pi F_G T \quad (9)$$

The first term in each equation represents the DC component into which the reflected light from the subject 13 is transduced by the image pick up tube 11. The second term represents the modulated signal of carrier frequency $fo$ and its harmonics and into which the red and blue color components are transduced by the image pick up tube 11. The output signal of the image pick up tube 11 is the signal into which are synthesized the color signals represented by Eqs. (7) – (9).

When the output signal of the image pick up tube 11 if fed into the low-pass filter 42 through the pre-video-amplifier 41, the synthesized electrical signal $E_{LPF}$ corresponding to the constant light quantity in Eqs. (7) – (9) is derived.

$$E_{LPF} = (A_G + B_G \text{COS } 2\pi F_G t) + 1/m\,(A_R + B_R \cos 2\pi F_R t) + 1/M\,(A_B + B_B \cos 2\pi F_B t) \quad (10)$$

From Eq. (10), the signal $E_{LPF}$ is the synthesized signal of the red, blue and green color signals.

When the output signal of the image tube 11 is fed to the bandpass filter 43 through the pre-video-amplifier 41, the output signal $e_{BPF}$ having a bandwidth centered around the fundamental frequency $fo$ is derived:

$$e_{BPF} = 2/\pi \sin(\pi/m)\,(A_R + B_R \cos 2\pi F_R t) \cos(2\pi fot) + 2/\pi \sin(\pi/m)\,(A_B + B_B \cos 2\pi F_B t) \sin(2\pi fot) \quad (11)$$

From Eq. (11) it is seen that the signal $e_{BPF}$ is the modulated signal whose carrier has the frequency $fo$ and which is quadrant-phase-modulated by the red color signal $(A_R + B_R \cos 2\pi F_R t)$ and the blue color signal $(A_B + B_B \cos 2\pi F_B t)$.

From Eq. (1) it is seen that when the maximum frequency $F$ in the $F_R$, $F_B$ and $F_G$ is less than $fo$, that is $f < fo$, each color component may be transmitted without any distortion.

When the output signal $e_{BPF}$ is transmitted to the first and second phase detectors 51 and 52, the red and blue color signals $(A_R + B_R \cos 2\pi F_R t)$ and $(A_B + B_B \cos 2\pi F_B t)$ may be derived separately. The carrier used in the phase detection will be described hereinafter.

The reason why the green color signal is derived separately when the output $e_{LPF}$ of the low-pass filter 42 is fed into the subtraction circuit 55 will be described. In addition to the output $e_{LPF}$ of the low-pass filter 42, the red and blue color signals are fed into the subtractor 55 from the first and second low pass filters 53 and 54 as the subtrahends. Therefore, the second and third terms in Eq. (10) are eliminated so that only the green color signal component is separately derived.

Next the description will be directed to the generation of the carrier required for phase-detecting the quadrant-phase-modulated signal represented by Eq. (11). When the output of the image pick up tube 11 is fed into the narrow band pass filter 44 through the pre-video-amplifier 41, the signal having a narrow bandwidth centered around the fundamental frequency $fo$ is derived. More specifically when $m = 2$ in Eq. (7) while $m' = 3$ in Eq. (8), the second harmonic component ($n = 2$) will be considered. In this case, in Eq. (7) representing the red signal component $$\sin(1/m\, r\pi)/n = ½ \sin(½ \times 2\pi) = 0$$

That is, no harmonic component is included. There is no harmonic component also in Eq. (9) representing the green color signal. However, in Eq. (8) representing the 2nd harmonic of the blue color signal component, $$\sin(1/m\, n\pi)/n = ½ \sin(⅓ > 2\pi) = \sqrt{3/4}$$

That is, only the 2nd harmonic component of blue signal is included, and is derived as the output of the narrow band pass filter 44. The amplitude-modulated component is removed by the amplitude limiter 45 and then fed into the frequency step-down circuit 46 where the frequency is stepped down to a half. The output of the frequency step-down circuit 46 is fed into the narrow band pass filter 47 so that the undesired component except the carrier is removed. Therefore the output signal from the narrow band pass filter 47 is not influenced by the light from the subject 13 and has the carrier frequency fo of a constant amplitude and phase.

In the instant embodiment, $m = 2$ while $m' = 3$, but $m$ may be three ($m = 3$) while $m'$,2 ($m' = 2$). When $m \neq m'$ there is a frequency at which either of the signal components represented in Eqs. (7) and (8) includes no harmonic component. Such frequency may be used in a similar manner.

FIG. 5 shows a typical frequency vs. output response characteristic of the equipment in accordance with the present invention. The area *a* represents the signal component represented by Eq. (10) and includes the red, blue and green color signal components. The area *a* has a bandwidth 3 MHz in the instant embodiment. The broken line *b* indicates the fundamental carrier which is 4.0 MHz in the instant embodiment. The area *c* represents the side bands. The line *d* indicates the carrier which is the second harmonic and area *e*, the side bands which include either of the red or blue color signal components as described hereinabove.

FIGS. 6A, 6B and 6C illustrate another method for generating shows the carrier frequency out of the signal from the image pick up tube 11; FIG. 6A shows the signal obtained from the image pick up tube when the color component shown in FIG. 3E is intercepted by the image pick up tube. In the second embodiment, the signal indicated in FIG. 6A is delayed by a very small time *t* from the horizontal scanning period (63.5 microseconds in Japan) as shown in FIG. 6B. In this case the waveforms of the outputs of the adjacent scanning lines may be considered the same because the picture image is correlated very closely. When the waveform shown in FIG. 6B is subtracted from that shown in FIG. 6A, the waveform as viewed in FIG. 6C is obtained. Since the output of the image pick up tube 11 is the waveform having a period of $T = 1/fo$, the waveform shown in FIG. 6C has the period T indicated in FIG. 3C and includes the carrier frequency component. The amplitude of each pulse in the difference waveform is varied in response to the variation in brightness, hue, and saturation of the subject 13 so that the phase of the carrier frequency *fo* is changed. In consequence it is impossible to use the frequency *fo* as the carrier. Therefore in the second embodiment, to remove the phase-shifted component the amplitude is sufficiently limited so that the amplitude of the pulse may not vary even when the color of the subject 13 is changed. Furthermore, the amplitude-limited signal is filtered to have a bandwidth centered around the frequency *fo*. Thus the carrier with a constant amplitude and phase may be obtained.

FIG. 7 is a block diagram of the system of separating the carrier frequency *fo* described with reference to FIGS. 6A, 6B and 6C. In FIG. 7 the components identical with those shown in FIG. 4 are designated by same reference numerals. Reference numeral 71 designates a delay circuit to which is fed the output of the pre-video amplifier 41, the delayed time being slightly different from the repetitive period of the horizontal scanning; 72, a subtractor to which is applied the output of the delay circuit 71 and the output of the pre-video-amplifier 41 as the subtrahend. The output of the subtractor 72 is fed into the amplitude limiter 45. The output of the amplitude limiter 45 is fed into the narrow band-pass filter 47. The subsequent circuitry is identical to that illustrated in FIG. 3 so that its function will not be described in detail.

FIGS. 8A and 8B are for explanation of a variation of the striped color filter assembly shown in FIG. 3A. FIG. 8A illustrates the color filter assembly identical to that shown in FIG. 3A while FIG. 8B illustrates a striped color filter capable of accomplishing the same function as that of the color filter assembly shown in FIG. 3A. The striped color filter shown in FIG. 8B consists of four types of color filter strip elements 81, 82, 83 and 84 arrayed on the same plane. For example, the strip 81 may transmit all of incident light; the strip 82 is a sort of a band elimination optical filter capable of preventing the transmission of red color; the strip 83 is an optical filter capable of passing only green color; and the strip 84 is also a band stop optical filter capable of preventing the transmission of the blue color. The same function may be attained by increasing a number of types of color filter strips.

FIG. 9 is a diagrammatic view of a variation of a color television camera equipment in accordance with the present invention illustrating the optical section and an image pick up tube. Components identical to those shown in FIG. 1 are designated by same reference numerals. Reference numerals 91 and 92 are a first and second striped color filter elements, the combination of which is equivalent to the color filter assembly 15 in FIG. 1; 93 and 94, reflection mirrors; and 95, 96 and 97, half-mirrors. The first and second color filters 91 and 92 are located in the different optical paths so that the light from the subject 13 is separated by the half-mirror 95 into two light beams after passing through the camera lens 14. One beam is re-directed to the first striped color filter 91 while the other beam is directed to the second color filter 92 through the half-mirror 97. The image focused upon the first color filter 91 is focused again upon the faceplate 18 of the image tube 11 by the relay lens 17 while the optical image focused upon the second color filter 92 is combined with the image from the first color filter 91 by the half mirror 96 after the reflection by the reflecting mirror 94. The light from the bias light 19 is combined or synthesized with the second light beam through the half mirror 95 by the half-mirror 97 and then focused upon the second color filter 92.

Next the first and second color filters 91 and 92 will be described in detail hereinafter. The first striped color filter 91 has the same construction as the striped color filter 301 indicated in FIG. 3A and comprises the strips transmitting all of incident light and strips which act as the band elimination optical filter so as to transmit all of incident light except red light. The second striped color filter 92 is similar to the color filter 302 indicated in FIG. 3A and comprises the strips capable of transmitting therethrough all of incident light and the strips which act as the band elimination optical filter for preventing the transmission of only blue light. The images of the first and second optical filters 91 and 92 are focused upon the faceplate 18 of the image pick up tube in such a manner that the pitches of the both of the first and second color filter images may be same and the images are out of phase by one-fourth pitch as viewed from FIG. 3A. Therefore it should be noted that the actual pitches of the color filters 91 and 92 may be different as long as the pitches of their images upon the plate 18 of the image pick up tube 11 are same. In other words, the color filters having the different pitches may be used in combination with a suitable optical system in such a manner that the images focused upon the faceplate 18 of the image pick up tube may have the same pitch.

FIG. 10 is a diagrammatic view of the optical section and an image pick up tube of a still another variation of the present invention and more specifically the optical section and the image pick up tube of a color television camera having a picture brightness or luninance separation system. Components identical to those shown in FIG. 1 are designated by same reference numerals. Reference numeral 101 designates an image pick up tube for deriving a high quality video signal; 102 and 103, half-mirrors; and 104, a reflecting mirror.

The light from the subject 13 is forcused by the camera lens 14 and split into two beams by the half-mirror 102. One beam passing through the half-mirror 102 is directed to the image pick up tube 11 through the half mirror 103, the striped color filter assembly 15 and the relay lens 17. The other light beam reflected by the half-mirror is redirected by the reflecting mirror 104 to the image pick up tube 101. The light from the bias light source 19 is directed to the image pick up tube 11 through the half-mirror 103, the color filter assembly 15 and the relay lens 17. The high quality video image signal is derived from the image pick up tube 101 while the high quality luminance signal is derived from the image pick up tube 11.

It is understood that various variations and modifications may be effected within the scope of the present invention as described hereinabove and as defined in the appended claims.

What is claimed is:

1. A color television camera equipment comprising an image tube and a striped color filter assembly including at least two striped color filter elements disposed in out of phase relation with each other by one-fourth pitch, each of said filter elements being capable of preventing the transmission therethrough of least one color light of a predetermined wavelength range of light from a subject, said filter elements being arranged for providing a predetermined harmonic component in only one color light to be used as a carrier frequency for demodulating the color light waves from the subject, whereby a plurality of color signal components may be derived from the single image pick up tube.

2. A color television camera equipment as specified in claim 1 wherein said striped color filter assembly comprises first and second striped color filter elements, said first color filter element comprising a plurality of alternately arrayed first and second color filter strip elements, said first color filter strip elements being capable of transmitting all of incident light energy from said subject and said second color filter strip elements being capable of preventing the transmission of light energy of a predetermined wavelength range, said second color filter element comprising a plurality of alternately arrayed third and fourth color strip elements, said third color strip elements being capable of transmitting all of incident light from said subject and said fourth color filter strip elements being capable of preventing the transmission of light energy in a predetermined wavelength range different from said first mentioned wavelength range, and said first striped color filter element is disposed so that each color strip element thereof may be out of phase substantially by one-fourth pitch relative to one of the strips of said second striped color filter element.

3. A color television camera equipment as specified in claim 2 wherein said first striped color filter element is disposed in contact with said second striped color filter element, and both of said first and second striped color filter elements have the same pitch.

4. A color televsion camera equipment as specified in claim 2 wherein said first and second striped color filter elements are disposed in different optical paths so that when the images of both of said first and second striped color filter elements are focused upon said image pick up tube, said images may have the same strip pitch and may be out of phase by one-fourth pitch relative to each other.

5. A color television camera equipment as specified in claim 1 wherein said striped color filter assembly comprises a plurality of four types of color strip elements alternately arrayed on the same plane, a first type color strip element being capable of transmitting therethrough all of incident light, a second type color strip element being capable of preventing the transmission of red color, a third type color strip strip element being capable of transmitting therethrough only green color and a fourth type color strip element being capable of preventing the transmission of only blue color.

6. A color television camera equipment as specified in claim 2 wherein said striped color filter assembly has pairs of strip elements of the same width which is so determined that a predetermined harmonic component may be contained only in one color component.

7. A color television camera equipment as specified in claim 1 further comprising a low pass filter for deriving only a DC video signal component from the output signal of said image pick up tube, a band pass filter for deriving the modulated signal component from said output signal of said image pick up tube, a narrow band pass filter for deriving only a predetermined harmonic component from said output signal from said image tube, means for generating a carrier of a predetermined frequency in response to the output of said narrow band pass filter, and means for processing the outputs from said low pass filter and said band pass filter so as to demodulate light reflected by said subject in response to the output of said first mentioned means.

8. A color television camera equipment as specified in claim 7 wherein said demodulating means comprises a first and second phase detectors for phase detecting the output of said band pass filter, means for changing into the carrier the predetermined harmonic component obtained from said narrow band pass filter and feeding its output to said second phase detector, a phase shifter for shifting the phase of the output of said changing means by 90° and feeding thus phase-shifted output to said first phase detector, and a subtractor to which are applied the output of said low pass filter and as the subtrahend the outputs of said first and second phase detectors, whereby the color signal component from light of said subject may be derived from said first and second phase detectors and said subtractor.

9. A color television camera equipment as speficied in claim 1 further comprising a low pass filter for deriving a DC video signal component from the output signal of said image pick up tube, a band pass filter for deriving the modulated signal component from said output signal of said image pick up tube, a delay circuit for delaying the output of said image pick up tube, a subtractor for deriving the difference between said output of said image pick up tube and the output of said delay circuit, means for generating the carrier having a predetermined frequency in response to the output of said subtractor and means for demodulating the light from said subject by processing the output of said low pass filter in response to the output of said carrier generating means.

10. A color television camera equipment as specified in claim 9 wherein said delay circuit has a delay time slightly different from the repetitive period of the horizontal scanning.

* * * * *